United States Patent [19]

Wilms et al.

[11] Patent Number: 5,188,786
[45] Date of Patent: Feb. 23, 1993

US005188786A

[54] CONTINUOUS GRANULATION PROCESS

[75] Inventors: Elmar Wilms, Dormagen; Frank Wiemer, Erkrath, both of Fed. Rep. of Germany

[73] Assignee: Henkel Kommanditgesellschaft auf Aktien, Duesseldorf, Fed. Rep. of Germany

[21] Appl. No.: 720,468

[22] PCT Filed: Oct. 12, 1989

[86] PCT No.: PCT/EP89/01205
  § 371 Date: Jun. 27, 1991
  § 102(e) Date: Jun. 27, 1991

[87] PCT Pub. No.: WO90/07375
  PCT Pub. Date: Jul. 12, 1990

[30] Foreign Application Priority Data

Dec. 27, 1988 [DE] Fed. Rep. of Germany ........ 3844025

[51] Int. Cl.$^5$ ................................................ B29B 9/08
[52] U.S. Cl. .................................... 264/117; 264/140; 252/89.1
[58] Field of Search ................ 264/117, 140; 252/891, 252/174, 174.15

[56] References Cited

U.S. PATENT DOCUMENTS 4,059,538 11/1977 Green et al. .................... 264/117
4,925,585 5/1990 Strauss et al. .................... 264/140

FOREIGN PATENT DOCUMENTS 0149264 7/1985 European Pat. Off. .
3617756 12/1986 Fed. Rep. of Germany .

*Primary Examiner*—Mary Lynn Theisen
*Attorney, Agent, or Firm*—Ernest G. Szoke; Wayne C. Jaeschke; Daniel S. Ortiz

[57] ABSTRACT

The invention concerns a process for the continuation granulation of a mixture containing at least one solid material and at least one liquid exhibiting a tendency to gel formation. In order to make it possible to work with a gel-like intermediate phase and yet continue to granulate, it is proposed that a mixture containing liquid raw materials which, by themselves, do not show any tendency to gel be used as the liquid exhibiting a tendency to gel, this mixture being produced in a static mixer, its average dwell time in the mixer being shorter than the gel time. The liquid is subsequently allowed to gel in a stirrer vessel, the dwell time in the stirrer vessel being longer than the gel time. Only then is the highly viscous mass thus obtained granulated together with the solid material.

18 Claims, No Drawings

CONTINUOUS GRANULATION PROCESS

This invention relates to a process for the continuous granulation of a mixture containing at least one solid and at least one liquid having a tendency to gel.

A granulation process of the type in question is used, for example, in the production of detergents. Hitherto, the granules have been produced as follows: the liquid ingredients were sprayed onto a granulated support produced by spray-drying or were incorporated in a prepared formulation by a granulation process. By contrast, solid ingredients were either made into a slurry and spray-dried or were directly incorporated in powder form.

Since problems consistently arise when liquids or liquid mixtures have a tendency to gel, attempts have always been made to avoid such gelation.

According to patent application P 38 35 918.9 filed in the name of Henkel KGaA on the 21.10.1988, it was surprisingly found that dry and free-flowing granules can be obtained if the liquid tending to gel is first allowed to gel completely and solids, such as for example spray-dried zeolite, bentonite or other predominantly apolar or weakly polar solids, are incorporated thereafter. The sequence can also be reversed.

The problem addressed by the present invention was to provide a process of the type mentioned at the beginning which worked with a gel-like intermediate phase and which could be carried out continuously.

According to the invention, the solution to the problem has been solved by a process of the type mentioned at the beginning which is characterized in that a mixture prepared in a static mixer and containing liquid raw materials with no tendency to gel on their own is used as the liquid with a tendency to gel, the average residence time in the static mixer being shorter than the gel time, in that the liquid is then allowed to gel in a stirred tank, the average residence time in the stirred tank being longer than the gel time, and in that the highly viscous paste obtained is only then granulated together with the solid.

According to the invention, therefore, gelation does not occur in the static mixer or even in the granulation unit, but only in the stirred tank. A stirred tank which the liquid enters continuously and from which the highly viscous paste is continuously discharged is used for gelation. The tank is stirred to prevent the formation both in the tank and within the already gel-like mass of any liquid passages through which the liquid could issue from the tank without the necessary residence time for gelation having been reached. The static mixer consists essentially of a tube-like passage in which individual swirling elements are firmly incorporated. The liquid is thoroughly mixed as it flows through this tubular element.

To ensure that the average residence time in the stirred tank is longer than the gel time, the throughflow rate of the liquid through the stirred tank and also the shape and rotational speed of the stirrer are correspondingly adapted to the contents of the tank. Providing the shape and rotational speed of the stirrer are suitably selected, a long average residence time can be obtained despite a large throughflow volume and a small tank capacity.

In one particularly favorable embodiment, the liquid enters at the bottom of the stirred tank while the gel is discharged from the upper part of the stirred tank.

Since the viscosity of the gel is dependent on temperature, it can be influenced by using a coolable and/or heatable stirred tank.

In another advantageous embodiment, the highly viscous paste, which is not readily pumpable, only has to travel a short distance between the stirred tank and the granulation unit.

To prevent the mixture from caking on the walls near the inlet openings of the granulation unit, at least one of the solids is introduced first during the granulation process. If the gel is subsequently added, caking problems do not arise. The apparent density can be adjusted through the granulation time in the granulation unit.

No particular granulation unit is required for the purposes of the invention. Any commercially available granulation units (including for example continuous moistening mixers) are suitable for carrying out the invention. In one particularly advantageous embodiment, however, a ploughshare mixer is used for granulation. It is of particular advantage if the gel to be granulated is chopped up immediately after entering the granulation unit and is subsequently swirled around with the solid. The initial chopping step ensures that a very small particle size is obtained very soon after entry of the gel into the granulation unit. Accordingly, the paste remains free-flowing in the granulation unit and does not cake to form a large lump.

In one particularly advantageous embodiment, a mixture of nonionic surfactants and water-containing or water-releasing substances, such as for example waterglass or a zeolite suspension, is used as the liquid with the tendency to gel. In addition, it is favorable to use spray-dried zeolite and/or a layer silicate, more particularly bentonite, or solid mixtures of preferably apolar or weakly polar substances as the solid.

According to the invention, the gel is continuously introduced into the granulation unit for producing the granules and granulated together with solids fed in either in free-flowing form by the liquids delivered to the stirred tank or by suitable feed units.

EXAMPLE

The invention is illustrated by the following Example. 30 to 50 parts of a nonionic surfactant, for example Dehydol LST, up to 20 parts waterglass solution, for example Wasserglas N, and 40 to 60 parts zeolite suspension are used for gelation. 35 to 55 parts of the described gel and 65 to 45 parts solids or solid mixtures are used for forming the granules. These solids consist of spray-dried zeolite, for example Wessalith P, or bentonite or of a mixture of zeolite and bentonite. They may even consist of a mixture of 30 to 70 parts zeolite, 10 to 40 parts bentonite and 10 to 30 parts soda. The quantitative ratios are variable, although soda should not make up more than 30 parts of the mixture of solids.

A gel of 20 parts nonionic surfactant, 10 parts waterglass and 20 parts zeolite suspension to which 50 parts spray-dried zeolite are added is disclosed as a special example. An apparent density of 840 g/l with good free-flow properties is thus obtained.

We claim:

1. A process for continuous granulation of a mixture containing at least one solid and at least one liquid, wherein the mixture forms a gel, which comprises: forming a liquid mixture of a solid with a liquid having no tendency to gel, the mixture forming a gel, in a static mixer, wherein the mean residence time of the mixture in the static mixer is less than the gel time of the mixture; gelling the liquid mixture in an agitated mixing zone, wherein the mean residence time in the agitated mixing zone is sufficiently long to form a gelled mixture; and mixing the gelled mixture with at least one solid to form granules in a granulation zone.

2. A process of claim 1 wherein, the mixing zone comprises an agitated vessel and the liquid enters at the bottom of the agitated vessel and the gel is discharged from the upper part of the agitated vessel.

3. A process of claim 1 wherein the agitated mixing zone comprises means to adjust the temperature of the contents of the agitated mixing zone.

4. A process of claim 1 wherein the granules are formed by first introducing at least one of the solids into a granulation zone, then introducing the gelled mixture into the granulation zone.

5. A process of claim 1 wherein a plowshare mixer comprises the granulation zone.

6. A process of claim 1 wherein, the gelled mixture is chopped in pieces immediately after its entry into the granulation zone, and is then turbulently mixed with the solid.

7. A process of claim 1 wherein, a mixture of nonionic surfactants and water-containing or water-releasing substances comprises the gel-forming liquid mixture.

8. A process of claim 1 wherein, the at least one solid comprises mixtures of nonpolar or weakly polar solid substances.

9. A process of claim 2 wherein the agitated mixing zone comprises means to adjust the temperature of the contents of the agitated mixing zone.

10. A process of claim 2 wherein the granules are formed by first introducing at least one of the solids into a granulation zone then introducing the gelled mixture into the granulation zone.

11. A process of claim 2 wherein the granulation zone comprises a ploughshare mixer.

12. A process of claim 9 wherein the granulates are formed by first introducing at least one of the solids into the granulation zone then introduced the gelled mixture into the granulation zone and wherein the granulation zone comprises a ploughshare mixer.

13. A process of claim 2 wherein the gelled mixture is chopped up immediately after entering the granulation zone and is turbulently mixed with the solid.

14. A process of claim 3 wherein the gelled mixture is chopped up immediately after entering the granulation zone and is turbulently mixed with the solid.

15. A process of claim 4 wherein the gelled mixture is chopped up immediately after entering the granulation zone and is turbulently mixed with the solid.

16. A process of claim 12 wherein the gelled mixture is chopped up immediately after entering the granulation zone and is turbulently mixed with the solid.

17. A process of claim 8 wherein the at least one solid comprises spray-dried zeolite or a layer silicate.

18. A process of claim 13 wherein the at least one solid comprises spray-dried zeolite or a layer silicate.

* * * * *